S. E. ALLEY & R. McGREGOR.
TRUNK PISTON.
APPLICATION FILED MAY 13, 1913.
1,073,062.  Patented Sept. 9, 1913.
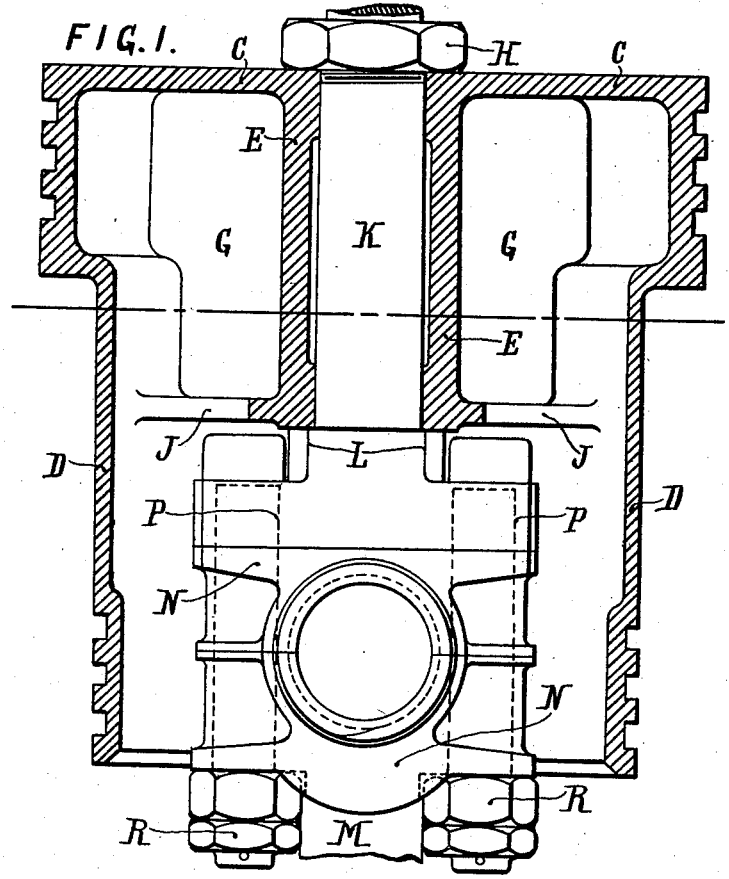
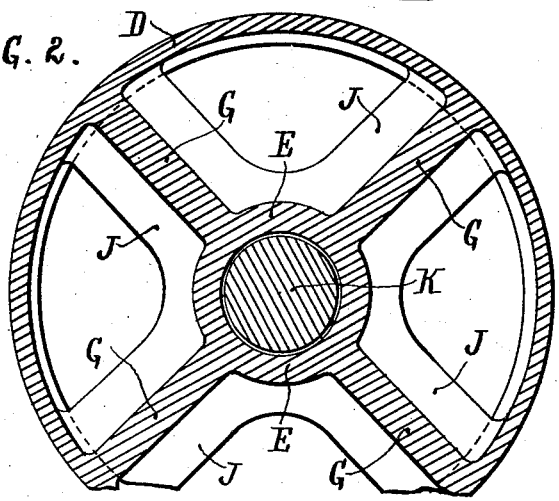
WITNESSES
L. H. Grote
M. E. Keir
INVENTORS
STEPHEN EVANS ALLEY
ROBERT McGREGOR
By Howson and Howson
Their Attorneys

UNITED STATES PATENT OFFICE.

STEPHEN EVANS ALLEY, OF GLASGOW, SCOTLAND, AND ROBERT McGREGOR, OF LONDON, ENGLAND.

TRUNK-PISTON.

1,073,062. Specification of Letters Patent. Patented Sept. 9, 1913.

Application filed May 13, 1913. Serial No. 767,430.

*To all whom it may concern:*

Be it known that we, STEPHEN EVANS ALLEY and ROBERT McGREGOR, subjects of the King of Great Britain and Ireland, and residents, respectively, of Glasgow, Scotland, and London, England, have invented certain new and useful Improvements in Trunk-Pistons, of which the following is the specification.

The invention relates to differential trunk-pistons—that is pistons having parts of two or more diameters—and has for its object to provide a construction giving more adequate strength and greater accessibility for removal of the gudgeon and other parts than hitherto usual.

A piston made according to the invention has as usual its closed end formed integral. Centrally within its main shell is a sleeve of considerable depth—of a depth at least twice the diameter of the gudgeon eye bolt or piston rod which as hereinafter explained passes through it. The central sleeve is connected by radial webs preferably of T or H section with the main shell. It is thus formed integrally with the shell in contradistinction to certain other known forms of trunk pistons in which a sleeve separate from the shell is used to receive the end of a piston rod. Through the central sleeve is passed a rod of steel or the like having a part which abuts on the end of the sleeve adjacent to the open end of the piston, and which is there connected to the usual connecting rod in known fashion. The outer end of the rod projecting beyond the closed end of the piston is fitted with a nut or other retaining device. The gudgeon bearing on the end of the rod, preferably made in halves, is so positioned relatively to the open end of the piston that the bolts and nuts securing the outer half in place are readily accessible.

In order that the invention and the manner of performing the same may be properly understood, there is hereunto appended a sheet of explanatory drawings in which—

Figure 1 is a sectional elevation and Fig. 2 a sectional plan of an example of the improved trunk piston.

The piston of this example is of stepped form having two acting faces, and its closed end C formed integral as usual with the shell D. Centrally within this shell is a sleeve E supported by webs G extending from it in radial planes and connected to the main shell. These webs G merge at their lower ends into webs J at right angles to them, and at their upper ends into the closed end C of the piston. The connecting webs may thus be considered as being of T or H section.

Within the central sleeve E is a rod K having a part L which abuts on the end of the sleeve E adjacent to the open end of the piston. This part L is connected to the connecting rod M in known manner by the usual gudgeon end bearing N and gudgeon pin. The outer end of the rod projects beyond the closed end C of the piston and is secured by a nut H.

The gudgeon end bearing N is made in halves, and the halves are so positioned relatively to the open end of the piston that the bolts P and nuts R securing the outer half in position are readily accessible.

It is obvious that a piston rod without a gudgeon may be secured in the sleeve E in the same manner as the rod K.

What we claim is:—

In a stepped trunk-piston of the type described, a closed head end, an axial sleeve integral therewith and extending therefrom into a portion of the piston of different diameter, radial webs connecting said sleeve with the shell of the piston, a threaded rod passing completely through the length of said sleeve and a nut thereon engaging the outer face of the closed end of the piston for securing the latter in position.

In testimony whereof we have signed our names to this specification, in the presence of two subscribing witnesses.

STEPHEN EVANS ALLEY.
ROBERT McGREGOR.

Witnesses as to the signature of Stephen Evans Alley:
DAVID FERGUSON,
WILFRED HUNT.

Witnesses as to the signature of Robert McGregor:
WILLIAM JOHN BALFOUR-MURPHY,
HERBERT WALTER STACEY.

---

Copies of this patent may be obtained for five cents each, by addressing the "Commissioner of Patents, Washington, D. C."